United States Patent [19]

Kung

[11] Patent Number: 5,987,452
[45] Date of Patent: Nov. 16, 1999

[54] QUERY TRANSLATION SYSTEM

[75] Inventor: Fen-Chung Kung, Bridgewater, N.J.

[73] Assignee: AT&T Corp, Middletown, N.J.

[21] Appl. No.: 08/787,491

[22] Filed: Jan. 22, 1997

[51] Int. Cl.[6] .................................................. G06F 17/30
[52] U.S. Cl. ..................... 707/4; 707/1; 707/2; 707/3; 707/5; 707/204; 711/113; 379/269
[58] Field of Search ................... 1/1; 375/200; 379/142, 379/269; 707/1–8, 101, 102, 103, 104, 204; 711/113; 380/23; 455/406; 340/825.34

[56] References Cited

U.S. PATENT DOCUMENTS

| | | | |
|---|---|---|---|
| 4,774,655 | 9/1988 | Kollin et al. | 707/4 |
| 5,297,279 | 3/1994 | Bannon | 707/103 |
| 5,412,806 | 5/1995 | Du | 707/2 |
| 5,590,319 | 12/1996 | Cohen et al. | 707/4 |
| 5,694,598 | 12/1997 | Durand | 1/1 |
| 5,701,461 | 12/1997 | Dalal | 1/1 |
| 5,713,014 | 1/1998 | Durflinger | 1/1 |
| 5,713,018 | 1/1998 | Chan | 1/1 |
| 5,721,904 | 2/1998 | Ito | 1/1 |

FOREIGN PATENT DOCUMENTS

WO90/08360  7/1990  European Pat. Off. .

OTHER PUBLICATIONS

"Translation of Queries to Account For Direct Communication Between Different DBMSs" Proceedings of the National Computer Conference, Chicago, Jun. 15–18, 1987, No. vol. 56, Jun. 15, 1987, American Federation of Information Processing Societies, pp. 637, 639–643, XP000011451, p. 637, line 1–p.639, rt. col., line 39.

"Translation of Object–Oriented Queries to Relational Queries"–Proceedings of the International Conference of Data Engineering, Taipei, Mar. 6–19, 1995, No. conf. 11, Mar. 6, 1995, Yu P S; Chen A L P (EDS), pp. 90–97, XP000551558, p. 90, left–hand col., line 1; right–hand col., line 31.

Abstract–Database Inspec Institute of Electrical Engineers, Stevenage, GB, Inspec. No. AN 5430879, XP0002060454; pp. 491–498, "On the Query Translation in Federative Relational Databases", Proc. 7th Int. Conf. Database and Expert Systems Applications, Sep. 9–10, 1996, Zurich.

Abstract–Database Inspec Institute of Electrical Engineers, Stevenage, GB, Inspec No. AN 2964466, XP002060455 & Templeton M.: "Mermaid–a front–end to distributed heterogenous database" Proc. IEEE, May 1987, USA, pp. 695–708.

Abstract–Database Inspec Institute of Electrical Engineers, Stevenage, GB, Inspec No. AN 2944581, XP002060456 & Owrang, M.M.: "Query Translation between data models", 6th Annual Int. Phoenix Conf. on Computers and Communications, Feb. 25–27, 1987, Scottsdale, USA, pp. 308–314.

Abstract–Database Inspec Institute of Electrical Engineers, Stevenage, GB Inspec No. AN 3067135, XP002060457 & Owrang M. et al.: "Translation of queries to account for direct communication between different DBMSs" AFIPS Conf. Proc., vol. 56, 1987, pp. 637–643.

Abstract Database Inspec Institute of Electrical Engineers, Stevenage, GB Inspec No. AN 1629491, XP002060458 & Takizawa M. et al.: "query translation in distributed databases" Proc. IFIP Congress, Oct. 6–9, 1980, Tokyo, pp. 451–456.

"Theory of Translation From Relational Queries to Hierarchical Queries"–IEEE Transactions On Knowledge and Data Engineering, vol. 7, No. 2, Apr. 1, 1995, pp. 228–245, XP000541405; p. 228, In. 1–24.

*Primary Examiner*—Thomas G. Black
*Assistant Examiner*—Diane D. Mizrahi

[57] ABSTRACT

A technique is provided for translating database queries used to perform database functions on a first database management system so that a user can perform the database functions on one or more second database management systems using the translated database queries. The database management systems can be based on a relational model database, a hierarchical model database, a network model database, or a file system (proprietary) model database.

31 Claims, 2 Drawing Sheets

QUERY TRANSLATION SYSTEM

FIELD OF THE INVENTION

This invention relates to computer systems, and more particularly, to translating database queries.

BACKGROUND OF THE INVENTION

The computer systems used by large organizations contain numerous database management systems that must be accessed and controlled. The database management systems are generally distributed across networks and are implemented with a variety of computing platforms. Commonly used database management systems are based on relational model databases, hierarchical model databases, network model databases, and file system (proprietary) model databases. As defined herein, file system model databases are any database management systems which are not compliant with relational, hierarchical, and network models. For example, a homegrown database management system that utilizes the computer file system for data storage is a file system model database. Each database management system typically uses a different query language to access and control its database. For example, relational model databases may use Structured Query Language (SQL) commands. Hierarchical database systems may use database interface function calls (e.g., "ctdli" calls for the International Business Machines IMS® database) or other application specific query language commands. Network database systems also use various application specific query languages. File system (proprietary) model databases may use an application specific query language based on database application program interface (API) function calls or other suitable application specific query language.

The query languages used by the database management systems are typically incompatible with each other. For example, a query language suitable for use with a relational model database will not, in general, operate with another database model, such as a hierarchical database. As a result, it may be difficult or impossible for a user at one database management system to perform certain database functions on another database management system.

In addition, the incompatibility between the database query languages prevents a user at a central or primary database management system from performing database functions on multiple secondary database management systems in parallel.

It would therefore be desirable if a system could be provided to overcome the incompatibility between the database query languages used by database management systems in a computer system or across computer systems.

It would also be desirable if a system could be provided to translate database queries so that a user at one database management system could perform database functions on another database management system.

It would also be desirable if a system could be provided to allow users to perform database functions on multiple database management systems in parallel.

It is therefore an object of the present invention to provide a system that overcomes the incompatibility between the database query languages used by the database management systems in a computer system or across computer systems.

It is also an object of the present invention to provide a system that translates database queries so that a user at one database management system can perform database functions on another database management system.

It is also an object of the present invention to provide a system that allows users to perform database functions on multiple database management systems in parallel.

SUMMARY OF THE INVENTION

These and other objects of the invention are accomplished in accordance with the principles of the present invention by providing a system that translates database queries from the database language used at a primary database management system to the database languages used at one or more secondary database management systems. The primary database management system and the secondary database management systems are implemented on a variety of different computing platforms typically in a distributed network environment. This type of configuration arises in various industries. For example, in the telephone industry, customer service representatives have direct access to a primary database management system. Secondary database management systems provide detailed support for services such as provisioning (providing telephone services to the customer), billing, and maintenance.

It is important that the secondary database management systems be updated to reflect the current information in the primary database management system. In addition, the customer service representatives may need to access information that is only available through one of the secondary database management systems. Sometimes it may be desirable for the customer service representative to be able to perform database functions on a number of the secondary databases in parallel.

However, the query languages used by the database management systems to access and control their associated databases are generally incompatible with one another. For example, the customer service database management system may use a relational model database that supports Structured Query Language (SQL) commands, whereas the maintenance database may use a hierarchical model database that supports an application specific query language that is incompatible with SQL.

The system of the present invention translates queries from the primary database management system (issued, e.g., in SQL) to the application specific query language used by, e.g., the hierarchical database management system. If desired, a database query can be translated into multiple secondary database application specific database query languages. In addition, the system can support the translation of database queries issued by one of the secondary database management systems and directed toward the primary database management system. The system also allows translation of database queries issued by secondary database management systems and destined to other secondary database management systems.

The system has query translation and communications application software implemented on the same computing platform as the primary application. The system also has query translation and communications application software in each secondary database that is capable of query translation.

In operation, if the system identifies a given database query as being of the type suitable for translation, the system determines which database management systems should be accessed using the given query. A translated query is constructed for each database management system to be accessed based on the given query. The translated queries are transmitted to the database management systems in parallel.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
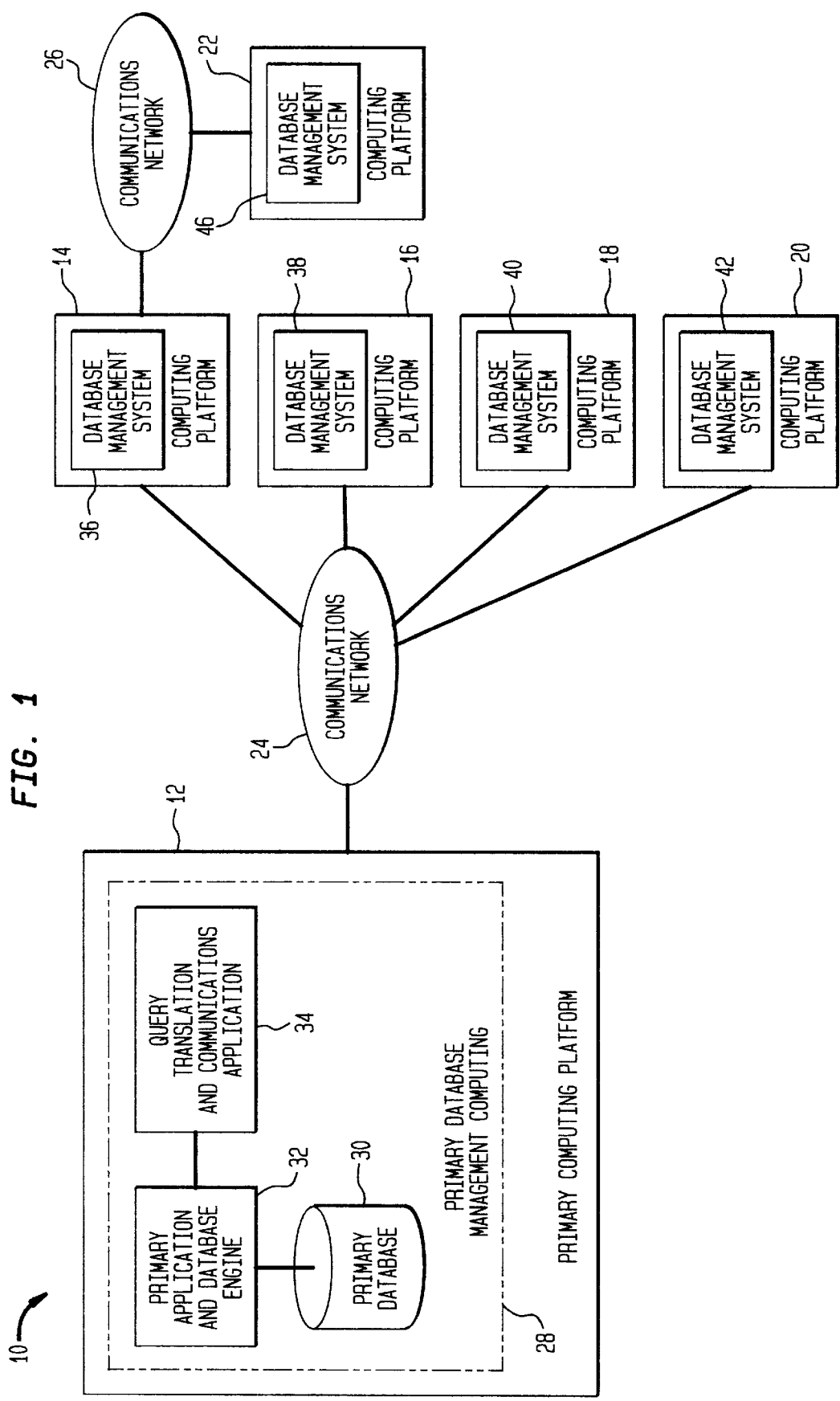
FIG. 1 is a diagram of a computer system having multiple computer platforms with database management systems that support different query languages.

A heterogeneous distributed computing environment 10 having a primary computing platform 12 and multiple secondary computing platforms 14, 16, 18, 20, and 22 is shown in FIG. 1. Communications networks 24 and 26, which may be, e.g., a local area network 15 (LAN) or a wide area network (WAN), are used to interconnect platforms 12, 14, 16, 18, 20, and 22. Primary computing platform 12 supports primary database management system 28 having primary database 30, primary application and database engine 32, and query translation and communications application 34. Primary database management system 28 allows an operator using. primary application and database engine 32 to access and maintain information in primary database 30 using various database queries. A database query is a type of instruction used to control and manipulate data in a database. Query functions include updating, retrieving, creating, or deleting data in database 30.

In an preferred embodiment, computer system supports features used in connection with providing telephone service, such as the ability to maintain customer records, telephone system maintenance records, etc. A customer service representative at primary computing platform 12 can receive telephone calls from customers using a standard telephone system (not shown in FIG. 1). A customer may desire to change his billing address or other customer information, may wish to subscribe to additional services, such as call waiting or call forwarding, or may wish help regarding a service interruption. Some information needed by the customer service representative, such as the information needed to update customer information or service features or to provide summary information concerning service interruptions, is maintained locally on primary database 30. Secondary database management systems (such as database management systems 36, 38, 40, 42, and 46) are used to store backup versions of the data files containing this information. In addition, certain information is only available on secondary databases.

In general, the database queries used by primary database management system 28 are different from the database queries used by secondary database management systems 36, 38, 40, 42, and 46. As a result, it is not possible in conventional systems to use the queries generated by the customer service representative at primary database management system 28 to perform database functions on secondary databases in secondary database management systems 36, 38, 40, 42, and 46 (e.g., to access information in database management systems 36, 38, 40, 42, and 46).

In accordance with the present invention, the queries used when the customer service representative performs database functions on primary database 30 with primary application and database engine 32 are translated by query translation and communications application 34. The translated queries are used to perform database functions on secondary databases in secondary database management systems 36, 38, 40, 42, and 46.

Figure 2:
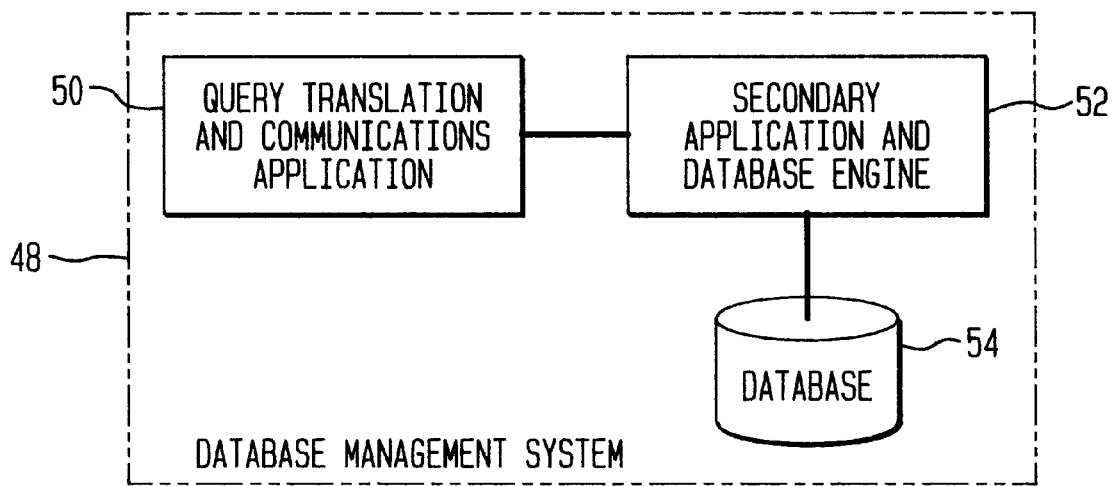
FIG. 2 is a diagram of an illustrative database management system.

The translated queries are transmitted to the secondary databases in database management systems 36, 38, 40, 42, and 46 by query translation and communications application 34. Details of an illustrative secondary database management system 48 are shown in FIG. 2. Query translation and communications application 50 supports the communications functions necessary to communicate with primary database management system 28 and other secondary database management systems. Secondary application and database engine 52 is used to control the overall operation of database management system 48 and to control the access of information in secondary database 54. When it is desired to access other databases, query translation and communications application 50 translates queries that are normally used by secondary application and database engine 52 to access database 54 into appropriate translated database queries.

Figure 3:
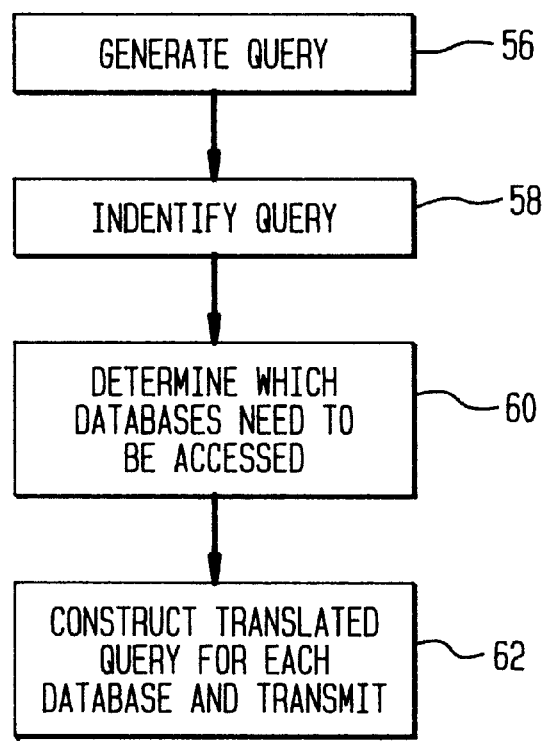
FIG. 3 is a flow chart of the steps involved in using the system of FIG. 1 to translate queries and perform database function on the various database management systems of FIG. 1.

Steps involved in query translation are shown in FIG. 3. Queries are translated by either primary query translation and communications application 34 (FIG. 1) or by a secondary query translation and communications application, such as query translation and communications application 50 (FIG. 2). For purposes of illustration, the query translation process shown in FIG. 3 will be described in connection with the generation and translation of queries by primary database management system 28, which are transmitted to one or more secondary database management systems selected from among database management systems 36, 38, 40, and 42.

At step 56, a query is generated by primary application and database engine 32. For example, a query may be generated when a customer service representative enters a command to update a customer record using primary application and database engine 32 to reflect a change in the status of a customer's telephone service. Typically, the query generated by primary application and database engine 32 performs a database function on primary database 30. For example, the query may instruct database 30 to update, delete, or create a customer record. Primary database 30 is used to maintain a set of records that are readily accessible to the customer service representative.

The data manipulation that is performed on primary database 30 is usually also performed on a secondary database. For example, if customer billing information is updated in primary database 30, billing information will also be updated in a suitable billing database in a secondary database management system.

In general, the queries used to perform database functions on the primary database will not be suitable for performing database functions on a secondary databases directly without being translated, because the secondary database management system will typically use a different type of database model than the primary database management system and will typically not use compatible queries. For example, primary database management system 28 may be a relational model database, whereas the secondary database management system may use a hierarchical model, a network model, or a file system (proprietary) model. In addition, even if the secondary database management system uses the same database model as the primary database management system 28, the two systems will not necessarily be compatible, because the queries used in the two systems may be different.

To perform database functions on the secondary database management systems, the primary query generated at step 56 must be translated. Queries suitable for translation are identified by query translation and communications application 34 at step 58. For example, the query type (e.g., UPDATE, DELETE, CREATE, etc.) can be compared to a list of predefined queries types. If the query is of the type contained on the predefined list, the query is identified as being a query suitable for translation.

Query translation and communications application 34 determines on which database or databases the database function is to be performed at step 60. For example, an update query for changing a customer's service features may need to be provided to a billing secondary database management system and a provisioning secondary database management system.

At step 62, query translation and communications application 34 constructs a translated query for each database management system identified in step 60 and transmits the translated queries to the appropriate database management system or systems via communications network 24. One suitable way in which to construct translated queries is to provide a predefined query mapping for each type of query to be translated.

Many different types of computers, database systems, and query languages can be used in heterogeneous distributed computing environment 10. If desired, heterogeneous distributed computing environment 10 may have the following illustrative arrangement.

Primary Computing platform 12 may support a customer care system formed using a computer having a relational model database. Queries to and from primary application and database engine 32 use Structured Query Language (SQL).

Computing platform 14 may be a personal computer. Database management system 36 may be based on a relational model database that uses SQL commands. In database management system 36, secondary application and database engine 52 (FIG. 2) may contain a provisioning application that handles records concerning the provision to customers of telephone services such as call waiting or call forwarding.

Computing platform 22 may be a workstation. Database management system 46 may be based on a network model database that uses an application specific query language suitable for a network model database. In database management system 46, secondary application and database engine 52 (FIG. 2) may contain a physical circuit maintenance and support application to handle functions associated with controlling the operation of physical telephone network circuits used to provide various telephone services.

As shown in FIG. 1, database management system 46 may be connected to database management system 36 via communications network 26. Database management system 46 may operate in conjunction with database management system 36 when providing telephone services to the customer. During operation, queries may be sent between database management system 36 and database management system 46. Queries sent from database management system 36 to database management system 46 may be translated by database management system 36 prior to transmission. Queries sent from database management system 46 to database management system 36 may be translated by database management system 46 prior to transmission. The configuration of secondary database management systems 36 and 46 and their linkage via communications network 26 illustrates how queries can be translated to facilitate communications between various secondary database management systems.

Computing platform 16 may be a workstation. Database management system 38 may be based on a network model database that uses an application specific query language suitable for a network model database. In database management system 38, secondary application and database engine 52 (FIG. 2) might contain an application similar to the provisioning application of database management system 36.

Computing platform 18 may be a mainframe computer. Database management system 40 may be based on a relational model database that uses an application specific query language suitable for a relational network model database (e.g., Structured Query Language). In database management system 40, secondary application and database engine 52 (FIG. 2) may contain a billing application that handles functions associated with billing a customer for telephone services.

Computing platform 20 may be a workstation. Database management system 42 may be based on a file system (proprietary) model database that uses an application specific query language suitable for a file system (proprietary) model database. In database management system 42, secondary application and database engine 52 (FIG. 2) may contain a maintenance application that handles maintenance records and functions associated with maintaining the equipment used to provide a customer with telephone services.

With this illustrative computer system arrangement, if a customer desires, for example, to change his billing address, the customer may contact a customer service representative by telephone. The customer service representative can access records in primary database 30 concerning the customers current billing address and can make changes to this primary database information using an UPDATE query, such as the query shown in Table 1.

TABLE 1

UPDATE CUSTOMER.TAB
SET ADDRESS = "NEW ADDRESS"
WHERE NAME = "JOE SMITH"

The UPDATE query of Table 1, which is generated at step 56 by primary application and database engine 32, is identified by query translation and communications application 34 as one of the query types for which translation is supported at step 58. At step 60, query translation and communications application 34 determines that the secondary databases on which the database function is to be performed are database management system 36 (provisioning) and database management system 40 (billing). At step 62, the translated queries shown in Tables 2 and 3 are constructed from a predefined query mapping based on the query in Table 1.

TABLE 2

UPDATE SUBSCRIBER.TAB
SET ADDRESS = "NEW ADDRESS"
WHERE NAME = "JOE SMITH"

TABLE 3

UPDATE ("CUSTOMER. TAB", "ADDRESS", "NEW ADDRESS")

The translated query of Table 2 is suitable for accessing database management system 36 to update the provisioning system with the most recent data regarding the customer's billing address. The translated query of Table 3 is suitable for accessing database management system 40 to update the billing system information.

Another typical transaction occurs when a customer wishes to update a service feature such as by cancelling call waiting or call forwarding. When the customer service representative enters the desired change, a query such as shown in Table 4 is generated using primary application and database engine 32 (step 56).

TABLE 4

UPDATE FEATURES.TAB
SET CWAITING = "NO"
WHERE. TEL = "201.386.1122"

This UPDATE query (generated at step 56 by primary application and database engine 32) is identified by query translation and communications application 34 as one of the query types for which translation is supported at step 58. At step 60, query translation and communications application 34 determines that the only secondary databases on which a database function needs to be performed is database management system 36 (provisioning). At step 62, the translated query shown in Table 5 is constructed from a predefined query mapping based on the query in Table 4.

TABLE 5

UPDATE SUBSCRIBER.FEATURE
SET CW = "N"
WHERE TEL = "201.386.1122"

Updating a billing address and updating a customer telephone service feature are examples of database queries in which data changes made to the primary database are mirrored by changes made to secondary databases. Other database queries are used to perform database functions nearly exclusively on the secondary databases. For example, if a customer calls a customer service representative to report problems with the customer's telephone service, the customer service representative may wish to provide the customer with maintenance information. The query generated at step 56 to inquire about the maintenance situation is identified as being a query appropriate for translation at step 58. At step 60, it is determined that the translated query should be sent to the maintenance application in database management system 42. At step 62, the translated query is constructed and transmitted. The customer service representative can inform the customer of the status of the maintenance problem (e.g., a severed cable in your area was reported at 11:00 AM and has been scheduled to be repaired by 2:00 PM) based on the information returned to primary application and database engine 32 from database management system 42.

The foregoing is merely illustrative of the principles of this invention and various modifications can be made by those skilled in the art without departing from the scope and spirit of the invention.

What is claimed is:

1. A method for use in a computer system in which a database query for performing a database function on a first database management system is used to perform the database function on a second database management system, the first database management system including a first application and database engine and a first query translation and communications application in communication with the first application and database engine, the second database management system including a second application and database engine, the method comprising the steps of:

identifying the database query as a query to be translated, wherein the database query is a query that is compatible with the first application and database engine but not with the second application and database engine;

constructing a translated database query for the second database management system using the first query translation and communications application, the translated database query being based on the database query, wherein the translated database query is a query that is compatible with the second application and database engine; and transmitting the translated database query to the second database management system.

2. The method defined in claim 1 wherein the step of identifying the database query comprises the step of determining whether the database query is contained on a list of predefined queries.

3. The method defined in claim 1 wherein the step of constructing includes the step of constructing a plurality of translated database queries including the translated database query, each of the plurality of translated database queries being based on the database query and being constructed for at least one of a plurality of database management systems other than the first database management system and including the second database management system;

and wherein the step of transmitting includes the step of transmitting each of the pluarlity of translated database queries to at least one of the plurality of database management systems.

4. The method of claim 3 including the step of determining which of a predetermined set of database management systems are included in the pluarilty of database management systems.

5. The method defined in claim 1 further comprising the step of generating the database query.

6. The method defined in claim 1 wherein the database query is in Structured Query Language (SQL).

7. The method defined in claim 1 wherein the second database management system is based on a hierarchical database model.

8. The method of claim 7 wherein the first database management system is based on a relational database model.

9. The method defined in claim 1 wherein the second database management system is based on a relational database model.

10. The method of claim 9 wherein the first database management system is based on a hierarchical database model.

11. The method defined in claim 1 wherein the second database management system is based on a network database model.

12. The method defined in claim 1 wherein the second database management system is based on a file system database model.

13. The method defined in claim 1 wherein the step of transmitting includes the step of transmitting the translated database query to the second database management system via a communications network.

14. A first database management system in which a database query for performing a database function on the first database management system is used to perform the database function on a second database management system, the second database management system including a second application and database engine, the first database management system comprising:

a first application and database engine; and a first query translation and communications application in communication with the first application and database engine configured to
identify the database query as a query to be translated, wherein the database query is a query that is compatible with the first application and database engine but not with the second application and database engine,
construct a translated database query for the second database management system based on the database query, wherein the translated database query is a query that is compatible with the second application and database engine, and
transmit the translated database query to the second database management system.

15. The first database management system defined in claim 14 wherein the first query translation and communications application is configured to determine whether the database query is contained on a list of predefined queries.

16. The first database management system defined in claim 14 wherein the first query translation and communications application is further configured to
construct a plurality of translated database queries including the translated database query, each of the plurality of queries being based on the database query and being constructed for at least one of a plurality of database management systems other than the first database management system and including the second database management system, and
transmit each of the plurality of translated database queries to at least one of the plurality of database management systems.

17. The first database management system defined in claim 14 wherein the first query translation and communications application is connected to means for generating the database query.

18. The first database management system defined in claim 14 wherein the database query is in Structured Query Language (SQL).

19. The first database management system defined in claim 14 wherein the second database management system is based on a hierarchical database model.

20. The first database management system of claim 19 wherein the first database management system is based on a relational database model.

21. The first database management system defined in claim 14 wherein the second database management system is based on a relational database model.

22. The first database management system of claim 21 wherein the first database management system is based on a hierarchical database model.

23. The first database management system defined in claim 14 wherein the second database management system is based on a network database model.

24. The first database management system defined in claim 14 wherein the second database management system is based on a file system database model.

25. A method for use in a computer system in which a database query for performing a database function on a first database management system is used to perform the database function on a second database management system, the first database management system and the second database management system each being based on a different type of database model, the method comprising the steps of:
identifying the database query as a query to be translated, wherein the database query is a query that is not compatible with the second database management system;
constructing a translated database query for the second database management system based on the database query, wherein the translated database query is a query that is compatible with the second database management system; and
transmitting the translated database query to the second database management system.

26. The method of claim 25 wherein the first database management system is based on a relational database model and the second database management system is based on a hierarchical database model.

27. The method of claim 25 wherein the first database management system is based on a relational database model and the second database management system is based on a network database model.

28. The method of claim 25 wherein the first database management system is based on a hierarchical database model and the second database management system is based on a relational database model.

29. A first database management system in which a database query for performing a database function on the first database management system is used to perform the database function a second database management system, the first database management system and the second database management system each being based on a different type of database model, the first database management system comprising:
a first application and database engine; and
a first query translation and communications application in communication with the first application and database engine, the first query translation and communications application being configured to
identify the database query as a query to be translated, wherein the database query is a query that is not compatible with the second database management system,
construct a translated database query for the second database management system based on the database query, wherein the translated database query is a query that is compatible with the second database management system, and
transmit the translated database query to the second database management system.

30. A method for use in a computer system in which a database query for performing a database function on a first database management system is used to perform the database function on a second database management system, the method comprising the steps of:
identifying the database query as a query to be translated;
constructing an unencrypted translated database query for the second database management system based on the database query; and
tranamitting the unencrypted translated database query to the second database management system.

31. A computer-readable medium having computer-executable instructions for performing steps comprising:
identifying a database query in a first database management system as a query to be translated, wherein the database query is a query that is not compatible with a second database management system;
constructing a translated database query based on the database query, wherein the translated database query is a query that is compatible with the second database management system; and
outputting the translated database query in a form suitable for transmission to the second database management system.

* * * * *